(12) United States Patent
Pashovych et al.

(10) Patent No.: US 11,096,391 B1
(45) Date of Patent: Aug. 24, 2021

(54) POLYBIGUANIDE SALTS IN SOLID FORM FOR WATER TREATMENT APPLICATIONS AND KIT

(71) Applicant: INNOVATIVE WATER CARE, LLC, Alpharetta, GA (US)

(72) Inventors: Volodymyr B. Pashovych, Alpharetta, GA (US); Matthew Muller, Cleveland, TN (US); Shannon Lafferty, Alpharetta, GA (US); Karen L. Boyd, Lawrenceville, GA (US)

(73) Assignee: INNOVATIVE WATER CARE, LLC, Alpharetta, GA (US)

( * ) Notice: Subject to any disclaimer, the term of this patent is extended or adjusted under 35 U.S.C. 154(b) by 0 days.

(21) Appl. No.: 15/399,279

(22) Filed: Jan. 5, 2017

Related U.S. Application Data

(60) Provisional application No. 62/275,349, filed on Jan. 6, 2016.

(51) Int. Cl.
*A01N 47/44* (2006.01)
*A01N 37/34* (2006.01)
*C02F 1/50* (2006.01)
C02F 103/42 (2006.01)

(52) U.S. Cl.
CPC .............. *A01N 47/44* (2013.01); *A01N 37/34* (2013.01); *C02F 1/505* (2013.01); *C02F 2103/42* (2013.01); *C02F 2303/04* (2013.01)

(58) Field of Classification Search
CPC ..... A01N 47/44; A01N 37/34; C02F 2103/42; C02F 1/505; C02F 2303/04
See application file for complete search history.

(56) References Cited

U.S. PATENT DOCUMENTS

| | | |
|---|---|---|
| 6,710,017 B2 | 3/2004 | Unhoch et al. |
| 7,494,963 B2 | 2/2009 | Ahmed et al. |
| 7,501,027 B2 | 3/2009 | Ahmed et al. |
| 7,511,006 B2 | 3/2009 | Shimmin et al. |
| 7,537,776 B1 | 5/2009 | Beilfuss et al. |
| 7,560,421 B2 | 7/2009 | Nakada et al. |
| 7,569,212 B2 | 8/2009 | Wagenaar |
| 8,440,212 B2 | 5/2013 | Unhoch et al. |
| 2007/0202185 A1* | 8/2007 | Amundson ............... A61K 8/20 424/490 |
| 2008/0258104 A1* | 10/2008 | Mullins ................. C01B 11/064 252/187.28 |
| 2009/0123513 A1 | 5/2009 | Greener |
| 2011/0045977 A1* | 2/2011 | Unhoch ................. A01N 47/44 504/121 |
| 2011/0049058 A1 | 3/2011 | Unhoch |
| 2012/0217201 A1* | 8/2012 | Ngo ...................... C02F 3/1268 210/610 |
| 2014/0124454 A1* | 5/2014 | Nichols ................. C02F 1/5272 210/732 |

OTHER PUBLICATIONS

Arch Chemicals, Inc. (Baquacil MSDS, p. 1-12, revised: Sep. 22, 2010).*

* cited by examiner

*Primary Examiner* — Genevieve S Alley
(74) *Attorney, Agent, or Firm* — Brown Rudnick LLP

(57) ABSTRACT

The present disclosure is directed to a sanitizing composition for dispensing into aquatic systems. The sanitizing composition contains a sanitizing agent containing water molecules that have been bound within the composition by a water binder. In one embodiment, the sanitizing agent is a polybiguanide salt and the water binder is an anhydrous salt. The resulting composition can be a solid that can be packaged in water degradable or water soluble packages for ease of handling and dispensing.

15 Claims, 2 Drawing Sheets

POLYBIGUANIDE SALTS IN SOLID FORM FOR WATER TREATMENT APPLICATIONS AND KIT

RELATED APPLICATION

The present application is based on and claims priority to U.S. Provisional Patent application Ser. No. 62/275349, filed on Jan. 6, 2016, which is incorporated herein by reference.

BACKGROUND

Polyhexamethylene biguanide (PHMB) is a known fast-acting and broad spectrum antimicrobial compound that is used in a variety of applications including eye and skin treatment compositions (U.S. Pat. Nos. 7,569,212; 7,560,421), cleaning compositions (U.S. Pat. Nos. 7,511,006; 7,501,027; 7,494,963), preservatives (U.S. Pat. No. 7,537,776), and as a treatment (sanitizer) for water systems (U.S. Pat. No. 6,710,017). PHMB is used as a sanitizer or preservative to kill bacteria (including methicillin-resistant *Staphylococcus aureus* (MRSA), *Salmonella, Campylobacter*, and *E. coli*) and viruses, and to control algae in a wide range of applications, including preserving wet wipes; controlling odor in textiles; preventing microbial contamination in wound irrigation and sterile dressings; disinfecting medical/dental utensil and trays, farm equipment, animal drinking water, and hard surfaces for food handling institutions and hospitals; and to deodorize vacuums and toilets. PHMB is used hi antimicrobial hand washes and rubs and air filter treatments as an alternative to ozone. As a preservative, PHMB is used in cosmetics, personal care products, fabric softeners, contact lens solutions, hand washes, and the like. For pool and spa applications, PHMB is sold under the tradename BAQUACIL by Arch Chemicals, Inc. (Allendale, N.J.).

PHMB has been shown to be an extremely effective antimicrobial agent when used in aquatic systems, such as swimming pools and spas. When used in swimming pools and spas, PHMB can effectively control algae growth.

One drawback to the use PHMB is that PHMB is packaged and sold as a liquid. Thus, the product is packaged with special precautions in order to prevent rupture of the containers and spills. Consequently, PHMB is typically packaged and shipped in expensive containers in large quantities. In addition to the cost of the containers, shipping PHMB with significant amounts of liquid is also very expensive and can require significant amounts of vehicle fuel to move the containers from location to location.

Problems have also been experienced in dispensing measured and controlled amounts of PHMB for application to aquatic systems, such as swimming pools and spas. Over application or under application of any chemical agent, for instance, can cause adverse conditions to occur. The swimming pool, for instance, may not have dear water, may be out of pH balance, or the like. Further, when dispensing a liquid chemical from a large container, accidental spills can occur resulting in waste.

Thus, a need exists for a water treatment product, such as a PHMB product, that is easy to handle and/or dispense.

SUMMARY

In general, the present disclosure is directed to a more convenient way to handle and dispense a chemical for treating aquatic systems. The chemical, for instance, may comprise a salt or chemical compound associated with water molecules. For instance, the chemical may comprise a biocide, an algaecide, an oxidizer, or other water treatment agent. In accordance with the present disclosure, the chemical is combined with a water binder that binds with free water present in the composition. Through the present disclosure, a liquid chemical can be converted into a solid, a paste or a gel. The solid or semi-solid produced through the present disclosure is easier to ship, handle and dispense into an aquatic system.

The present disclosure is also directed to a kit that contains the solid or semi-solid composition in conjunction with other water treatment compositions. The other water treatment compositions may contain, for instance, a biocide, an oxidizer, a clarifier, or any other adjuvant, such as a zinc salt.

In one embodiment, the present disclosure is directed to a sanitizing composition for treating aquatic systems. The aquatic system may comprise, for instance, a pool or spa. In accordance with the present disclosure, the composition comprises a polybiguanide salt having a water content of at least 5% by weight combined with a water binder comprising an anhydrous salt. The anhydrous salt is water soluble and is present in the sanitizing composition in an amount sufficient to bind at least 90% by weight of all free water contained in the polybiguanide salt. For example, in one embodiment, the anhydrous salt is present in the sanitizing composition in an amount sufficient to form a solid or semi-solid. In one embodiment, the polybiguanide salt may have a water content of from about 10% to about 80% by weight, such as from about 15% to about 30% by weight and can still be converted into a solid or semi-solid in accordance with the present disclosure.

Any suitable anhydrous salt may be used in accordance with the present disclosure. In one embodiment, for instance, the anhydrous salt may comprise a metal salt and/or a sulfate salt or a halide salt. Examples of anhydrous salts that may be used include magnesium sulfate, magnesium chloride, sodium sulfate, calcium chloride, calcium sulfate, zinc sulfate, zinc chloride, copper sulfate, copper chloride, or mixtures thereof. The one or more anhydrous salts may be present in the sanitizing composition in an amount from about 5% to about 55% by weight, such as in an amount from about 8% to about 30% by weight.

In one embodiment, the polybiguanide salt may comprise polyhexamethylene biguanide and can be present in the sanitizing composition in an amount from about 40% to about 90% by weight, such as from about 60% to about 85% by weight. In one particular embodiment, the polybiguanide salt comprises polyhexamethylene biguanide hydrochloride.

The present disclosure is also directed to a sanitizing product for aquatic systems. The sanitizing product can comprise a water soluble package that contains a solid composition. The solid composition may comprise a polybiguanide salt in combination with a water binder. The water binder can comprise an anhydrous salt as described above. The water soluble package can be made from a water soluble film, such as polyvinyl alcohol. In one embodiment, the water soluble package contains the sanitizing composition in an amount sufficient for a single dose for treating a preselected volume of water. In this manner, the water soluble package can be placed in contact with the water for releasing the sanitizing composition without having to measure the amount of sanitizing composition needed for the particular application.

The present disclosure is also directed to a kit for sanitizing aquatic systems. The kit can contain a plurality of containers. Each container can contain a different water treatment composition. Each water treatment composition can have a different purpose or function. For instance, each water treatment composition may contain a different biocide, a different algaecide, an oxidizer, a clarifying agent, a zinc compound, or any other suitable adjuvant.

In one embodiment, the kit includes a first container containing a polybiguanide composition that comprises a polybiguanide salt combined with a free water binder. The free water binder can comprise an anhydrous salt and may be present in the composition sufficient to convert the polybiguanide salt into a solid or semi-solid. The kit can further include a second container containing a water treatment composition. The water treatment composition may comprise an oxidizer or a biocide. In one particular embodiment, the kit includes a third container wherein the second container contains a biocide and the third container contains an oxidizer. In still another embodiment, the kit may include a fourth container containing a zinc salt. Each container may contain a single dose of each water treatment composition for application to an aquatic system such as a pool or spa.

In one embodiment, the second container contains a biocide that comprises 2,2-dibromo-3-nitrilopropionamide (DBNPA). The DBNPA can be present in solid form, such as a briquette, a tablet, or in granular form. Alternatively, the DBNPA can be in liquid, paste, gel, dispersion, suspension, or solution form.

In an alternative embodiment, the second container may contain an oxidizer. The oxidizer may comprise an alkali or alkaline earth perborate salt, an alkali or alkaline earth percarbonate salt, an alkali or alkaline earth persulfate salt, a peroxide such as hydrogen peroxide, carbamide peroxide, percarboxylic acid, peracetic acid, or mixtures thereof.

In one embodiment, the DBNPA may be contained in a second container, while the above described oxidizer may be contained in a third container.

In one embodiment, the kit may further include a container containing a zinc salt.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
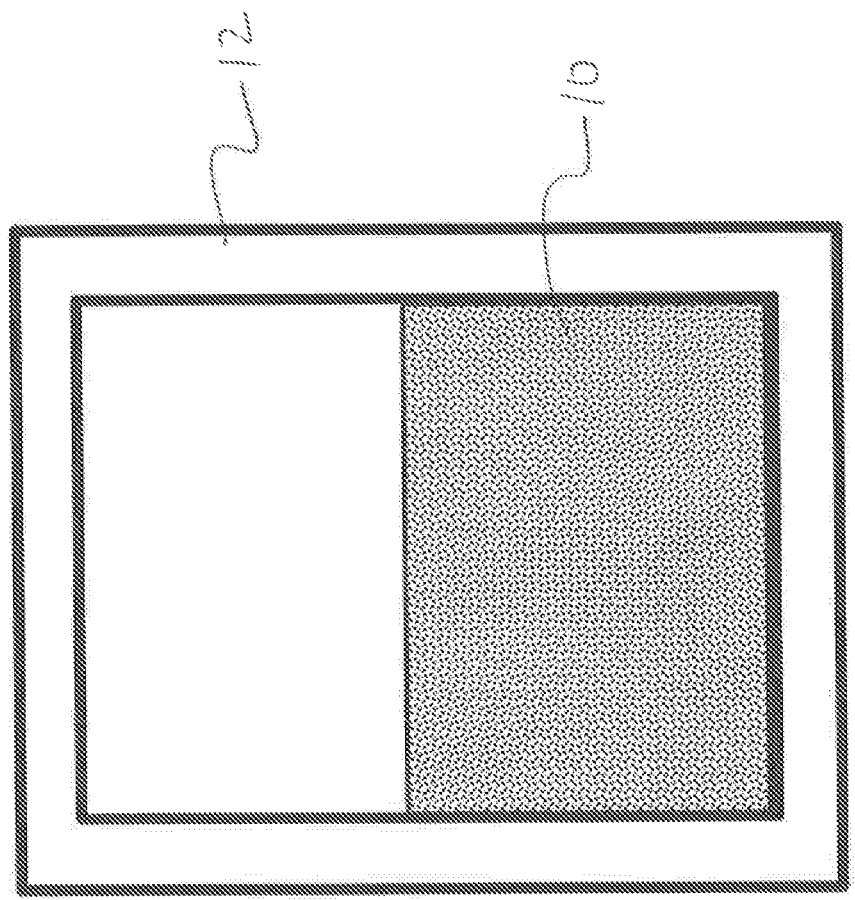
FIG. 1 is a plan view of one embodiment of a water treatment product made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to combining a water treatment agent with a free water binder. The free water binder binds with water molecules and results in a product that is easier to handle and dispense into aquatic systems. For example, polybiguanide salts are known to contain water in an amount from about 5% to about 80% by weight. Due to the presence of free water molecules, the polybiguanide salt is typically produced as a water based solution and sold in rigid plastic containers. The presence of the water molecules prevents packaging the polybiguanide salts in any container that degrades in water or that adversely interferes with the product in the presence of water. In accordance with the present disclosure, however, a water treatment agent that contains water, such as a polybiguanide salt, is combined with a water binder, such as an anhydrous salt, that binds with essentially all of the free water in the composition. In this manner, a solid or semi-solid product can be produced that contains no appreciable amounts of free water and allows for the composition to be easily handled and dispensed.

In one embodiment, the sanitizer composition of the present disclosure comprises a polybiguanide salt having a water content of at least 5% by weight combined with a free water binder. The free water binder is combined with the polybiguanide salt in an amount sufficient to bind with at least 90% by weight of the free water contained in the salt. In one embodiment, for instance, the water binder can be added in excess. The water binder may comprise, for instance, an anhydrous salt that converts the free water into solid crystallohydrate that prevents the water from adversely interfering with the container in which the sanitizing composition is kept.

The sanitizing composition of the present disclosure as described above provides various advantages and benefits. For instance, eliminating all of the free water in the polybiguanide salt allows for the polybiguanide salt to be packaged in more convenient and safer containers. Instead of having to meter and pour the water treatment agent into a water source, the solid or semi-solid sanitizing composition of the present disclosure can be packaged in discrete units or pods for dispensing into aquatic environments. For example, in one embodiment, the sanitizing composition can be packaged in a water soluble container. The container can be made from a water soluble film or paper. Each package can contain a single dose of the polybiguanide salt allowing the packages to be smaller, easier to handle, store and recycle than conventional containers. In order to dispense the polybiguanide salt, the single dose package can be contacted with water in the aquatic system which will first dissolve the packaging and then the sanitizing composition. Being able to treat an aquatic system with a single dose package adds a level of comfort to the consumer that the correct amount of the sanitizing composition is being dispensed and that the aquatic system, such as a pool or spa, is being properly maintained.

The sanitizing composition of the present disclosure also reduces or eliminates the need for liquid carrier ingredients. Consequently, the sanitizing composition of the present disclosure is easier to package and ship especially in relation to previous PHMB compositions which were packaged and shipped containing significant amounts of liquids. By eliminating the liquid component, shipping PHMB is less costly and more environmentally friendly.

As described above, in one embodiment, the sanitizing composition comprises a polybiguanide salt, hi one embodiment, the polybiguanide salt may comprise polyhexamethylene biguanide, such as polyhexamethylene biguanide hydrochloride (commonly known as PHMB's).

PHMB is commonly represented by the following formula, though it is known to exist as a complex mixture of polymeric biguanides with various terminal groups including guanidine (not shown).

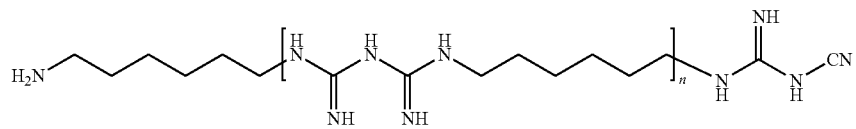

The value n represents the number of repeating units of the biguanide polymer.

More particularly, PHMB can be a mixture of various biguanide polymers that can include different combinations of terminal groups, e.g., amine, cyanoguanidino, and guanidine. Based only on these three terminal groups, at least six possible biguanide polymers can exist. There can be one biguanide polymer with two terminal amine groups, which is referred to as PHMB-AA, one with two terminal cyanoguanidino groups, which is referred to as PHMB-CGCG, and one with two terminal guanidine groups, which is referred to as PHMB-GG (see, below). There are also the three possible biguanide polymers having a combination of two different terminal groups. Again, based on the above terminal groups they include amine-cyanoguanidino (PHMB-ACG), amine-guanidino (PHMB-AG) and guanidine-cyanoguanidino (GCG), Accordingly, a sample of PHMB may comprise a mixture of polymeric biguanides with the three mentioned terminal groups. Moreover, some of the composition can include in-chain polymeric guanide (not shown), The subscript "n" represents the average number of repeating groups, and a distribution of polymer length exists for each of the polymers shown below.

effectively traps the free water contained in the composition. In general, any suitable water binder may be used, In one embodiment, for instance, the water binder may comprise an anhydrous salt that can convert free water into a crystal form. The water binder is generally water soluble when dispensed in an aquatic system and should be selected such that the water binder does not interfere with the polybiguanide salt or with any other chemicals that may be present in the aquatic system.

Various different types of anhydrous salts may be used as the water binder. In one embodiment, for instance, the anhydrous salt may comprise a metal salt. The water binder may also comprise a sulfate salt, a halide salt, or the like. Particular examples of anhydrous salts that may be used in accordance with the present disclosure include magnesium sulfate, magnesium chloride, sodium sulfate, calcium chloride, calcium sulfate, zinc sulfate, zinc chloride, copper sulfate, copper chloride, or mixtures thereof. Selecting the appropriate anhydrous salt can depend upon the particular application and various factors. For instance, adding copper salts may not be appropriate for some aquatic systems.

In general, the sanitizing composition of the present disclosure contains one or more biguanide salts in an amount

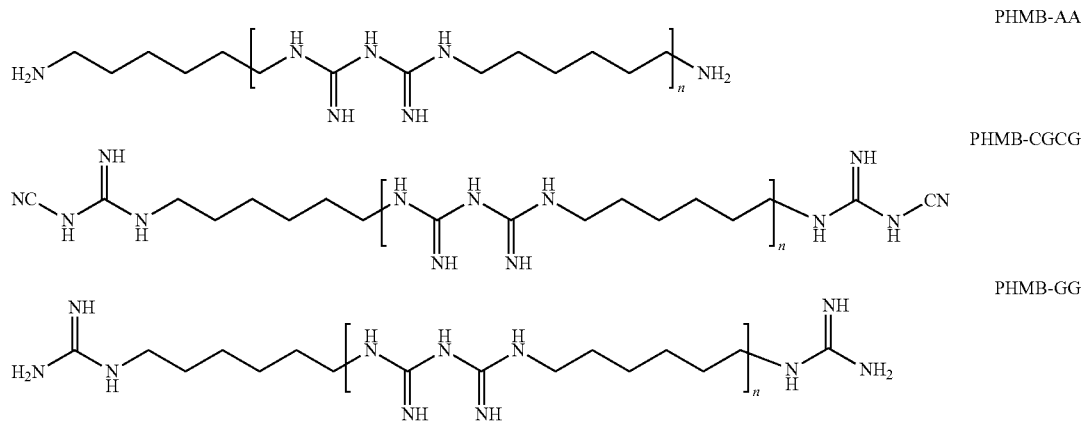

wherein n can be from about 1 to about 50, such as from about 1 to about 20.

Polyhexamethylene biguanide, such as polyhexamethylene biguanide hydrochloride has a broad antimicrobial range and is fast acting. Further, the antimicrobial agent is stable over a broad pH range and can work in conjunction with a salt of a quaternary ammonium cation.

As explained above, polybiguanide salts such as PHMB typically have a water content of at least 5%, such as at least 10%, such as at least 15%, such as at least 20%. For instance, many polybiguanide salts can have a water content of from about 5% to about 80% by weight. Due to the presence of free water, polybiguanide salts are typically packaged and sold in liquid form.

In accordance with the present disclosure, however, the polybiguanide salts are combined with a water binder that greater than about 40% by weight, such as in an amount greater than about 50% by weight, such as in an amount greater than about 60% by weight, such as in an amount greater than about 70% by weight, such as in an amount greater than about 80% by weight. The polybiguanide salts are generally present in an amount less than about 90% by weight, such as in an amount less than about 80% by weight. One or more water binders can be present in the composition sufficient to bind at least 90% by weight, such as at least 93% by weight, such as at least 95% by weight, such as at least 98% by weight of all free water contained in the polybiguanide salt. In one embodiment, excess anhydrous salt may be added to the composition so that essentially all of the free water is consumed by the salt. In general, one or more anhydrous salts are present in the composition in an amount greater than about 5% by weight, such as in an amount greater than about 10% by weight, such as in an amount greater than about 15% by weight, such as in an amount greater than about 20% by weight, such as in an amount greater than about 25% by weight, such as in an amount greater than about 30% by weight, such as in an amount greater than about 35% by weight, such as in an amount greater than about 40% by weight. One or more anhydrous salts are generally present in an amount less than about 55% by weight, such as in an amount less than about 40% by weight, such as in an amount less than about 30% by weight. In one embodiment, one or more anhydrous salts may be present in the composition in an amount from about 8% by weight to about 30% by weight, such as in an amount from about 8% by weight to about 15% by weight.

As described above, the sanitizing composition of the present disclosure is in solid form or semi-solid form. Because substantially all of the free water has been trapped by the water binder, the sanitizing composition can be packaged in all different types of containers, even containers that may be unsuitable when contacted with water. In one embodiment, for instance, the sanitizing composition may be packaged in a container made from water soluble or water dispersible materials. For example, referring to FIG. 1, one embodiment of a package made in accordance with the present disclosure is shown. The package 12, in this embodiment, is a flexible package containing a sanitizing composition 10 in accordance with the present disclosure. The package 12 can be made from a material that degrades when exposed to a degrading agent, such as water. In one embodiment, for instance, the package 12 can be made from a polyvinyl alcohol film. Polyvinyl alcohol films are water soluble, but are also resistant to many chemical agents. In the embodiment illustrated, the package 12 is made from two polymer films that are sealed at their edges to form a seam. In an alternative embodiment, the package 12 may be made from a water soluble or water dispersible paper.

The amount of sanitizing composition 10 contained within the package 12 can depend upon numerous factors and the particular application for which the sanitizing composition is being used. In one embodiment, the package 12 can be considered a pod that contains a single dose of the sanitizing composition 12. In this manner, the entire package can be immersed in the aquatic system being treated. The material used to produce the package 12 will first dissolve followed by the sanitizing composition 10. For instance, in one embodiment, the package 12 can be made from a water soluble polymer film or from a water soluble paper and may dissolve in less than about 15 minutes, such as less than about 10 minutes, such as less than about 5 minutes. For instance, the package may dissolve in from about 2 to about 3 minutes. Once the package 12 dissolves, the sanitizing composition contacts the water and also dissolves for treating the water and destroying microorganisms, such as algae. In general, the sanitizing composition dissolves and disperses within the aquatic system for a time period of from about 10 minutes to about 4 hours, such as from about 30 minutes to about 3 hours. In one embodiment, for instance, the sanitizing composition will dissolve in from about 1 hour to about 2 hours.

For many applications, the amount of sanitizing composition 10 within the package 12 can be from about 20 grams to about 500 grams. The above dosage levels can treat bodies of water of from about 1000 gallons to about 100,000 gallons. The dosage levels can be altered depending upon the size of the aquatic system. For instance, the dosage of the sanitizing composition can be greater than about 50 grams, such as greater than about 70 grams, such as greater than about 100 grams, such as greater than about 120 grams, such as greater than about 140 grams, such as greater than about 160 grams, such as greater than about 180 grams, such as greater than about 200 grams. The dosage level is generally less than about 500 grams, such as less than about 300 grams, such as less than about 240 grams, such as less than about 220 grams, such as less than about 200 grams for 20,000 gallon systems.

In order to produce the sanitizing composition of the present disclosure, in one embodiment, the polybiguanide salt can be heated and combined with the water binder, such as the anhydrous salt. In one embodiment, for instance, the polybiguanide salt can be heated to a temperature of from about 40° C. to about 90° C., such as from about 50° C. to about 70° C., such as from about 55° C. to about 65° C. In one embodiment, the polybiguanide salt may have a molten form once heated, The water binder can then be added and combined with the heated polybiguanide salt. In one embodiment, for instance, the water binder may comprise magnesium sulfate.

In one aspect, the present disclosure is also directed to a kit for treating aquatic systems. The kit may comprise a first container containing the sanitizing composition described above. For instance, the kit may contain the package as illustrated in FIG. 1. The kit can include at least a second container for containing a water treatment agent that may be used in conjunction with the sanitizing composition. The water treatment agent may comprise, for instance, a biocide, an oxidizer, or any suitable adjuvant. For example, in one embodiment, the second container may contain an oxidizer, such as a peroxide. In an alternative embodiment, the second container may contain a biocide, such as 2,2-dibromo-3-nitrilopropionamide (DBNPA).

Figure 2:
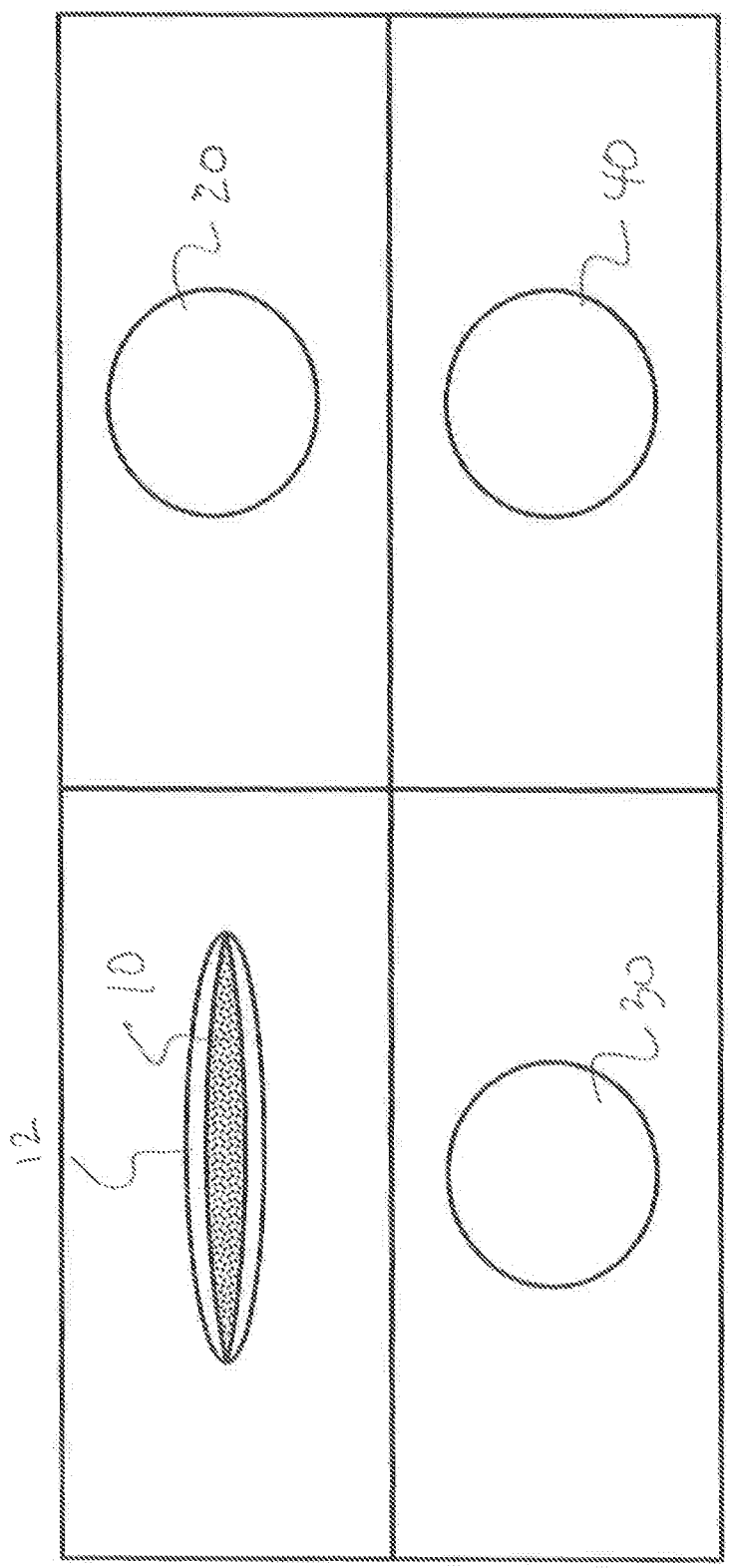
FIG. 2 is a plan view of one embodiment of a kit constructed in accordance with the present disclosure.

Referring to FIG. 2, for instance, a kit in accordance with the present disclosure is shown. In this embodiment, the kit includes four different containers. The first container comprises the package 12 as shown in FIG. 1 containing the sanitizing composition 10.

The second container 20 may contain a biocide, such as DBNPA. For instance, the second container 20 can contain a water treatment composition containing 1 to 100% by weight DBNPA, such as from about 5% to about 40% by weight DBNPA. The water treatment composition may be in solid form, such as a briquette or a tablet, or granular form. Alternatively, the water treatment composition contained in the second container 20 may be a liquid, a paste, a gel, a dispersion, a suspension, or a solution. When present in a solid form, the water treatment composition may contain DBNPA in an amount generally from about 20% to about 95% by weight, such as from about 50% to about 90% by weight. When present in a liquid, paste or gel form, on the other hand, the DBNPA may be present in the composition in an amount from about 5% to about 60% by weight, such as from about 5% to about 20% by weight. The second container 20 can comprise a bottle, pouch, a dissolvable or biodegradable bag, or other suitable feeder or container.

As shown in FIG. 2, the kit further includes a third container 30. The third container 30 contains a third water treatment composition that contains an oxidizer. Useful oxidizer compounds include alkali and alkaline earth perborate salts, alkali and alkaline earth percarbonate salts, alkali and alkaline earth persulfate salts, hydrogen peroxide, percarboxylic acid and peracetic acid, carbamide peroxide, and combinations thereof. One particularly useful oxidizer is hydrogen peroxide. Preferably, the oxidizer comprises from 1 to 100 percent by weight, based on the total weight of the third water treatment composition, and more preferably from 10 to 50 percent by weight, based on the total weight of the third water treatment composition. Like the second water treatment composition, this third water treatment composition may be in solid form, such as a briquette, tablet, or granule form, or a liquid, paste, gel, dispersion, suspension, or solution form in the same concentration ranges as the second water treatment composition above. The third water treatment composition may be contained in a bottle, pouch, a dissolvable or biodegradable bag, or other suitable feeder or container.

The kit shown in FIG. 2 further includes a fourth container 40. The fourth container 40 can contain any suitable water treatment agent that can be used in conjunction with the other compositions. For instance, the fourth container 40 may contain a flocculant, a filter aid, or any suitable adjuvant.

In one embodiment, the fourth container 40 contains one or more water soluble zinc salts in order to provide a source of zinc ions. Suitable water soluble zinc salts include, but are not limited to, zinc sulfate monohydrate ($ZnSO_4.H_2O$), zinc sulfate heptahydrate ($ZnSO_4.7H_2O$), zinc carbonate ($ZnCO_3$), zinc nitrate ($ZnNO_3)_2$), zinc borate, zinc hydroxide, zinc phosphate, as well as combinations of these. One preferred zinc salt is zinc sulfate.

In addition to or instead of a zinc salt, the fourth container 40 may contain various other water treatment agents. Useful flocculants include alum, polyaluminum chloride, aluminum chlorohydrate, aluminum sulfate, calcium oxide, calcium hydroxide, iron (II) chloride, iron (II) sulfate, polyacrylamide, polydiallyldimethylammonium chloride (polyDADMAC), sodium acuminate, sodium silicate, and combinations thereof. Useful filter aids include Alum, cellulose, chitin, chitosan, diatomaceous earth, and the like, as well as combinations of these.

The fourth container 40 may comprise a bottle, a pouch, a dissolvable or biodegradable bag, or other suitable feeder or container.

The compositions according to the present disclosure may also contain various other additives known in the water treatment art. These additives include but are not limited to pigments, binders, water softeners, phosphate removers, corrosion inhibitors, dissolution rate modifiers, lubricants, color-containing salts, biocides, buffers, chelating agents, other bactericides, algaecides, fungicides, sequestering agents, clarifiers, enzymes, pigments, dyes, thickeners, fragrances, surfactants, co-solvents, biodisperants, corrosion inhibitors, biopenetrants, sorbitan monostearate, sulfamic acid, tallowpropylamine diamine, cocopropylamine diamine, oleylpropylamine diamine, stearyldimethylbenzylammonium chloride, and combinations thereof. These additives may be pre-blended with any of the components of the composition, and are generally present in the composition of the invention in amounts ranging from 0.2 to 10 weight percent.

The present disclosure may be better understood with reference to the following example.

EXAMPLE NO. 1

60 grams of a PHMB gel containing 80% by weight PHMB was preheated to 60° C. 9.5 grams of anhydrous magnesium sulfate was combined with the preheated gel and simultaneously filled into a film pouch comprised of a polyvinyl alcohol film. The pouch was heat sealed and allowed to cool to room temperature. The polyvinyl alcohol film pouch was stable and did not degrade after an extended length of time indicating that the anhydrous salt had absorbed or consumed all free water.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for preparing a solid or semi-solid sanitizing composition for treating aquatic systems including pools and spas comprising:
   providing a polybiguanide salt having a water content from about 10% to about 80% by weight;
   combining the polybiguanide salt with an anhydrous salt; and
   binding at least 90% by weight of all the free water contained in the polybiguanide salt to the anhydrous salt,
wherein the amount of polybiguanide in the sanitizing composition is at least 50% by weight, and the sanitizing composition does not include a peroxide.

2. The process of claim 1, wherein the anhydrous salt comprises a sulfate salt or a halide salt.

3. The process of claim 2, wherein the anhydrous salt comprises a metal salt.

4. The process of claim 3, wherein the anhydrous salt comprises magnesium chloride, sodium sulfate, calcium chloride, calcium sulfate, zinc sulfate, zinc chloride, copper sulfate, copper chloride, or mixtures thereof.

5. The process of claim 4, wherein the anhydrous salt is present in the composition in an amount from about 5% to about 55% by weight.

6. The process of claim 5, wherein providing the polybiguanide salt comprises providing a polybiguanide gel.

7. The process of claim 6, wherein providing the polybiguanide salt comprises preheating the polybiguanide salt.

8. The process of claim 7, wherein preheating the polybiguanide salt comprises preheating the polybiguanide salt to 60° C.

9. The process of claim 8, wherein providing the polybiguanide salt comprises providing a polybiguanide salt that comprises polyhexamethylene biguanide (PHMB).

10. The process of claim 9, wherein combining the polybiguanide salt and the anhydrous salt comprises combining the polybiguanide salt and anhydrous salt in a ratio of about 6:1.

11. The process of claim 5, wherein combining the polybiguanide salt and the anhydrous salt comprises combining the polybiguanide salt and the anhydrous salt in a film pouch.

12. The process of claim 11, wherein the film pouch is made from a water soluble polymer film.

13. The process of claim 12, wherein the water soluble film comprises polyvinyl alcohol.

14. The process of claim 5, comprising the further step of cooling the sanitizing composition.

15. The process of claim 5, wherein binding at least 90% by weight of all the free water contained in the polybiguanide salt to the anhydrous salt comprises converting the free water in the polybiguanide salt into a crystallohydrate.

* * * * *